United States Patent [19]

Schollenberger

[11] Patent Number: 5,455,124
[45] Date of Patent: Oct. 3, 1995

[54] SEALING VALVE FOR CONTAINER OPENINGS

[75] Inventor: Gerd Schollenberger, Sersheim, Germany

[73] Assignee: Busak +Shamban GmbH & Co., Stuttgart, Germany

[21] Appl. No.: 157,178

[22] PCT Filed: May 20, 1992

[86] PCT No.: PCT/DE92/00424

§ 371 Date: Dec. 7, 1993

§ 102(e) Date: Dec. 7, 1993

[87] PCT Pub. No.: WO92/22932

PCT Pub. Date: Dec. 23, 1992

[30] Foreign Application Priority Data

Oct. 30, 1991 [DE] Germany .................. 41 35 711.6
Jun. 8, 1993 [DE] Germany .................. 9107094 U

[51] Int. Cl.⁶ .................................................. H01N 2/12
[52] U.S. Cl. .................. 429/53; 429/82; 220/361
[58] Field of Search ........................ 429/53, 82; 220/366

[56] References Cited

U.S. PATENT DOCUMENTS

| | | | |
|---|---|---|---|
| 3,320,097 | 5/1967 | Sugalski | 429/82 X |
| 3,994,749 | 11/1976 | Decker et al. | 429/53 |
| 4,442,184 | 4/1984 | Spanur. | |
| 4,709,832 | 12/1987 | Mantyla. | |
| 4,883,641 | 11/1989 | Wicks et al. | 220/366 X |

FOREIGN PATENT DOCUMENTS

| | | | |
|---|---|---|---|
| 0348856 | 1/1990 | European Pat. Off. | G04C 10/00 |
| 0373150 | 6/1990 | European Pat. Off. | H01M 2/12 |
| 0377501 | 7/1990 | European Pat. Off. | H01M 2/08 |
| 1020248 | 11/1957 | Germany. | |
| 3225767 | 1/1984 | Germany | H01M 2/12 |
| 59-191260 | 10/1984 | Japan | 429/53 |

*Primary Examiner*—Stephen Kalafut
*Attorney, Agent, or Firm*—Flynn, Thiel, Boutell & Tanis

[57] ABSTRACT

The invention concerns a sealing valve for apertures in containers, the valve comprising a cover element and, running round the edge of the cover element and integral with it, a wall element. In one application of the valve as a gas-release valve for accumulators, the valve (20) is shaped like a cap and has a beading (24) with a sharply projecting sealing edge running round the inside of the cap wall. On the inside of the cap are control channels (25, 25', 25") which extend from the top of the cap to the beading (24) and allow the pressure at which gas is released from the accumulator to be set within a given range.

20 Claims, 4 Drawing Sheets

SEALING VALVE FOR CONTAINER OPENINGS

This application is a national phase application of PCT application no. PCT/DE92/00424, published as WO 92/22932.

BACKGROUND OF THE INVENTION

The invention concerns a sealing valve for container openings and consists of a cover element and a wall element formed thereon and a sealing-bead circling around the wall element, whereby the sealing-bead runs along the inside of the wall of the cap.

Sealing valves of this kind have become known in the art through Japanese patent application 58-67407.

The cells of storage batteries require a gas release valve which safely prevents the escape of battery acid and $H_2$ gas under normal pressure conditions and, at a particular overpressure, opens within the battery cell to provide for a gas release. Since storage batteries of this type, in particular lead storage batteries for motorized vehicles, are mass-produced articles, it is necessary that their gas release valves be produced as economically as possible.

In prior battery embodiments it was customary to screw a sealing stopper, by means of a screw thread, into an opening of the cell. This stopper exhibited a small bore which facilitated a gas release of the battery cell when the sealing stopper was screwed into position. Thereby, however, battery fluid would often escape towards the outside to cause a corrosion of the sheet metal components in the vicinity of the battery.

An additional known solution consisted in the slip-fitting of a cylindrically formed sealing cap over a cylindrical gas release connector of the storage battery, the cap being made from a resilient elastic material. However, during the mass-production of these known sealing caps made from a rubber-elastic material which was necessitated for reasons of elasticity such as silicone elastomer, polyurethane (PU), and thermoplastic elastomers, unavoidably large tolerance fluctuations in the inner diameter would occur, as a result of which the production yield was disadvantageously reduced or the sealing effectivity rendered questionable. Verification of the functionability required 100% testing.

A battery stopper is known in the art from the above-mentioned Japanese patent application JP-A-59191260 with the application number 58-67407 in which a gas release connector seats over a substantial surface on the outer perimeter. Notches are provided for on the connector itself by means of which the medium under pressure interacts with the stopper.

It is the purpose of the invention to provide for a sealing valve suitable for storage batteries such that a secure gas release is achieved while simultaneously effecting a sealing with respect to the escape of battery fluids as well as an economical manufacture with increased yield.

The fundamental concept of the invention serving to achieve the above purpose consists in providing for a sealing-bead which runs around the wall element of the sealing valve, the sealing-bead exhibiting on the one hand the sealing and on the other hand the gas release function, whereby at least one control channel is provided for on the inside of a cap or a stopper, which extends from the top of the cap to the sealing-bead. By means of this sealing-bead the tolerance variations of the inner diameter during the course of mass-production are kept under control. In addition by means of the control channels which extend up to the edge of the sealing bead, the adhesive forces described above which occur between the outer wall of the gas release connector and the inner wall of the known sealing cap are prevented which had, up to this point, rendered a reliable gas release questionable. The control channels effect, for a particular overpressure inside the battery cell, an opening of the sealing valve precisely at those locations where the control channels end at the sealing-bead; in this fashion a defined release pressure of approximately 80 to 120 mbar can be adjusted.

SUMMARY OF THE INVENTION

In a preferred embodiment the inventive sealing valve exhibits a cap-like shape and the sealing-bead runs along the inside of the wall element of the cap. It is preferred when the sealing bead exhibits at least one pronounced edge which, in the case of the sealing cap, presses against the outer wall of the gas release connector.

In principal all rubber-elastic materials are suitable for the manufacture of the sealing valve in accordance with the invention. However, it is preferred if, for example the fluoroelastomers FPM, fluorocarbonmonomer (FCM), ethylene-propylenedien-elastomer (EPDM) as well as silicone elastomer material are utilized.

It is preferred when the sealing valve is circularly cylindric in shape and when the cover element is flat. It is particularly advantageous when three control channels are arranged symmetrically displaced by 120° from each other.

In a further improved embodiment the edge of the sealing valve is provided with notches, the number of which corresponds to the number of control channels and each of which is flush with respect to the control channel or control channels. The depth of these edge-notches is such that they do not cut through the prominent edge of the sealing-bead and the bottom of the notch lying across from the prominent edges is approximately as wide as the control channels.

It has proven to be particularly advantageous when the edge-notches exhibit a circular arc-shaped profile as well as a sharp edge in the direction of the edge of the sealing cap. With the assistance of the edge-notch it is possible to adjust, in a more accurate and advantageous fashion, the particular overpressure inside the battery cell at which the gas release is to take place.

The thickness of the sealing-bead can easily be determined, according to the application, through a series of tests but is preferentially less than the wall thickness of the wall element.

It is advantageous when the depth of the control channel or the control channels assumes a value of approximately half the thickness of the wall element.

In an alternative embodiment the inventive sealing valve is not configured in a cap-shaped manner rather in a stopper-shaped form, whereby the sealing-bead and, if appropriate, the control channels are provided for on the outer wall.

Further details and advantages of the invention are described more closely below with a plurality of embodiments in the drawings:

DESCRIPTION OF THE PREFERRED EMBODIMENT

Figure 1A:
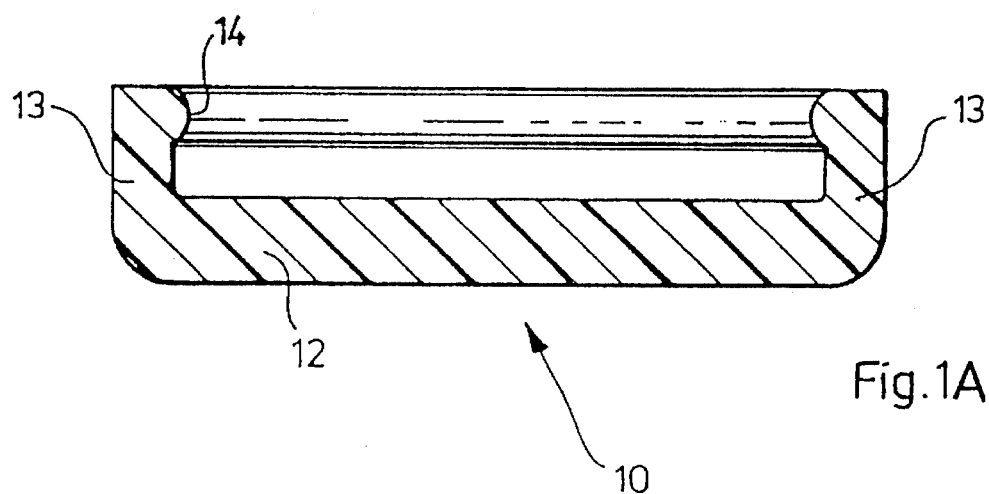
FIG. 1A is a cross sectional view showing an embodiment of a sealing valve according to the invention with differing sealing-bead contours which exhibit at least one bead-edge.
Figure 1:
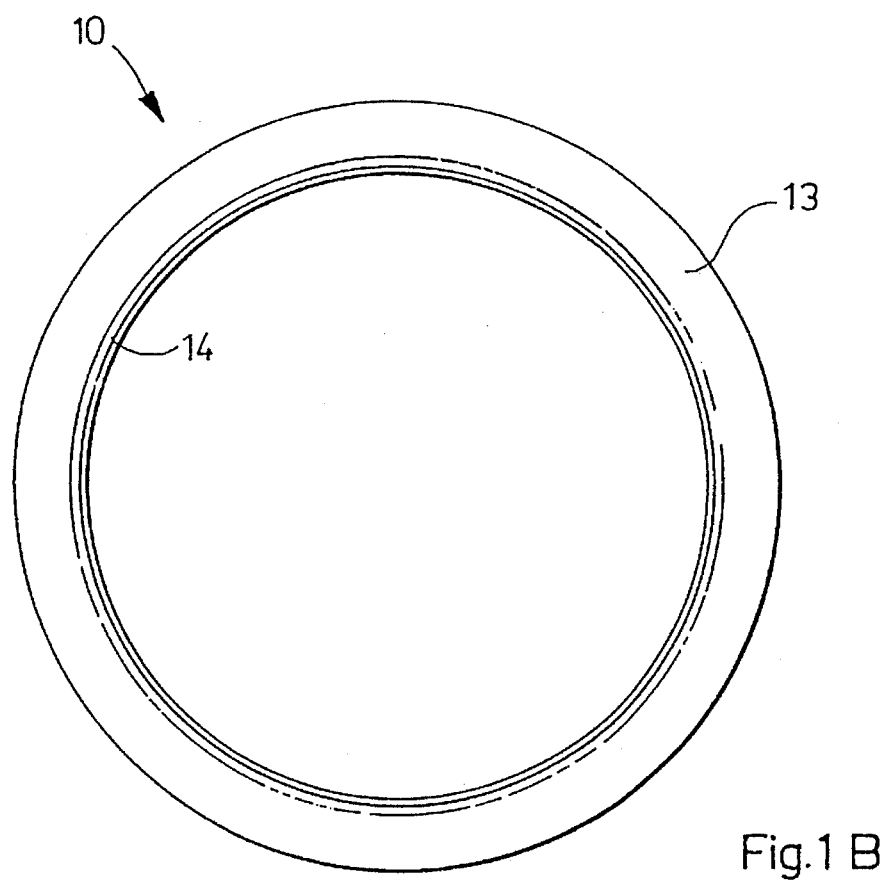
FIG. 1B is a plan view thereof, and FIG. 1C are several cross sectional views showing varying shapes of sealing bead contours.
Figure 1:
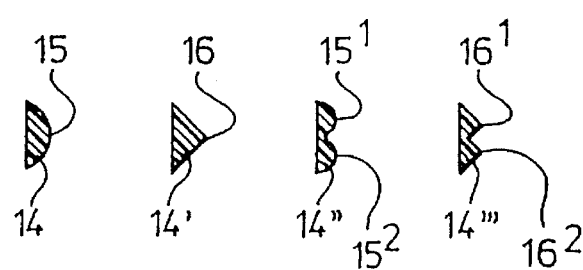

The cap-shaped embodiment labelled with 10 and represented in FIGS. 1A and 1B in cross-section and planar view, exhibits a cylindrical wall element 13 projecting perpendicularly with respect to a rounded circular cover element 12, the inside of the wall element 13 being provided with a ring-shaped bead 14. The representation of FIG. 1B shows that the sealing bead 14 forms a closed loop. FIG. 1C shows varying shapes of sealing bead contours 14, 14', 14" and 14'". It is important that the sealing-bead exhibits at least one bead edge, which is labelled in FIG. 1C as 15, 16, $15^1$, $15^2$, $16^1$, and $16^2$.

The sealing-bead configured in this fashion provides for a compensation of the tolerance variations in the inside diameter of the wall element 13 which occur during mass-production of the sealing valve since the sealing bead presses against the outer wall of the gas release connector only along its bead edge. In contrast thereto, the inside of the wall element is largely free from the outer wall of the gas release connector. Thereby, the undesirable adhesive forces between the inside of the wall element and the outer wall of the gas release connector described above do not occur and it is possible, using the inventive sealing valve, to maintain a desired gas release pressure.

Figure 2:
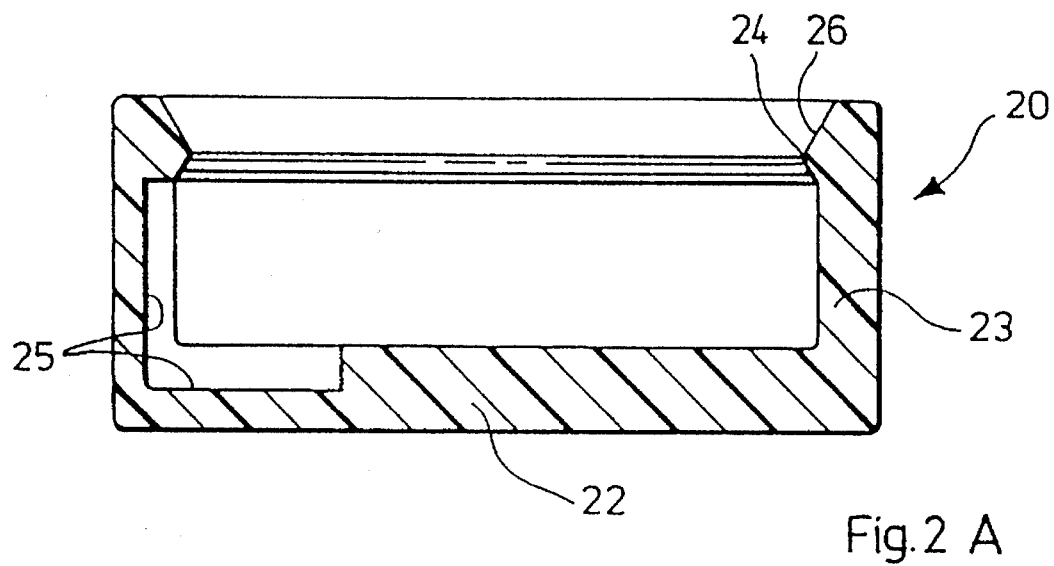
FIG. 2A is a cross sectional view showing a sealing valve with control channels which can exhibit sealing-bead contours as shown in FIGS. 1A–1C.
FIG. 2B is a plan view thereof.
Figure 2B:
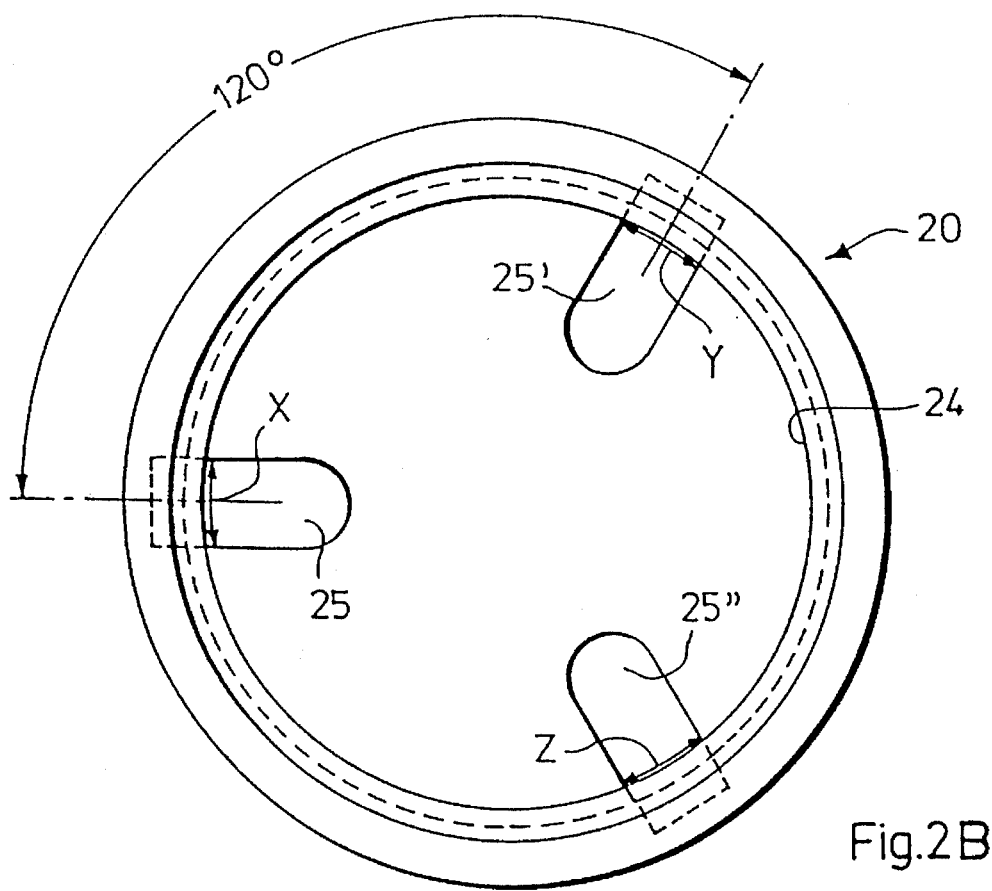

FIG. 2 shows the inventive embodiment in cross-section (FIG. 2A) and in plan view (FIG. 2B). This embodiment, labelled with 20, is likewise circular-cylindrically shaped and exhibits, along with the sealing-bead 24, three control channels 25, 25' and 25" which are mutually displaced by 120°. It can be seen in FIG. 2A that these control channels lead from the inside of a cover element 22 up to the sealing-bead 24 on the inside of the wall element 23. The inside of the cap edge runs diagonally with respect to the edge of the sealing-bead 24 and thereby forms a guiding or centering bevel 26 which facilitates the placing-on of the cap. In this preferred embodiment the gas release occurs solely at the locations labelled with X, Y, Z of the sealing-bead 24. In this fashion it is possible to adjust the gas release pressure in a better defined fashion. For reasons of stability the control channels 25, 25' and 25", as is clearly shown in FIG. 2B, do not lead up to the middle point of the cover element 22.

In this embodiment as well, the dimensions of the sealing valves are chosen according to the requirements and the number and thickness as well as the contours of the sealing-bead 24 and, if appropriate, the depth of the control channels are determined through a series of tests.

Figure 3A:
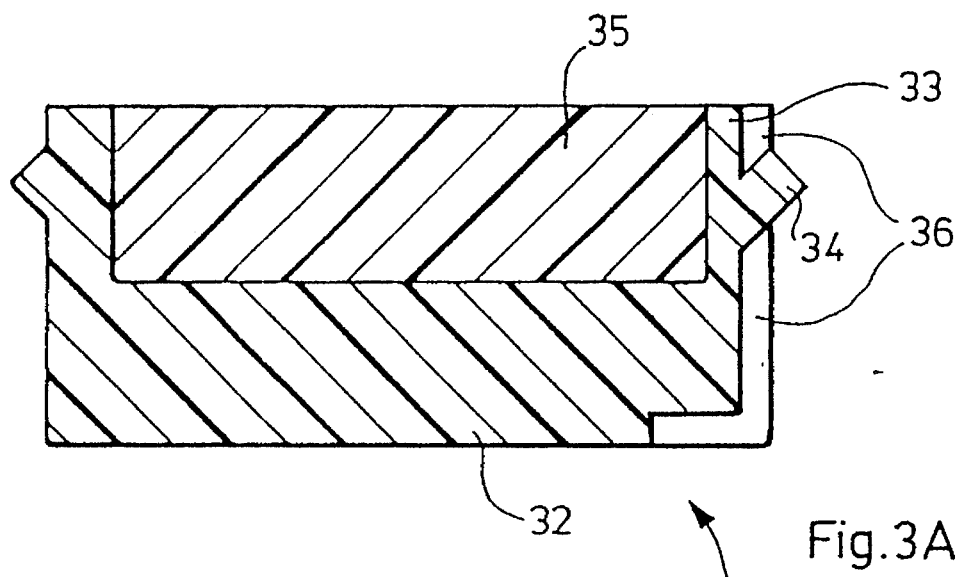
FIG. 3A is a cross sectional view showing an alternative embodiment with which the inventive sealing valve is configured in a stopper-shaped manner.
Figure 3B:
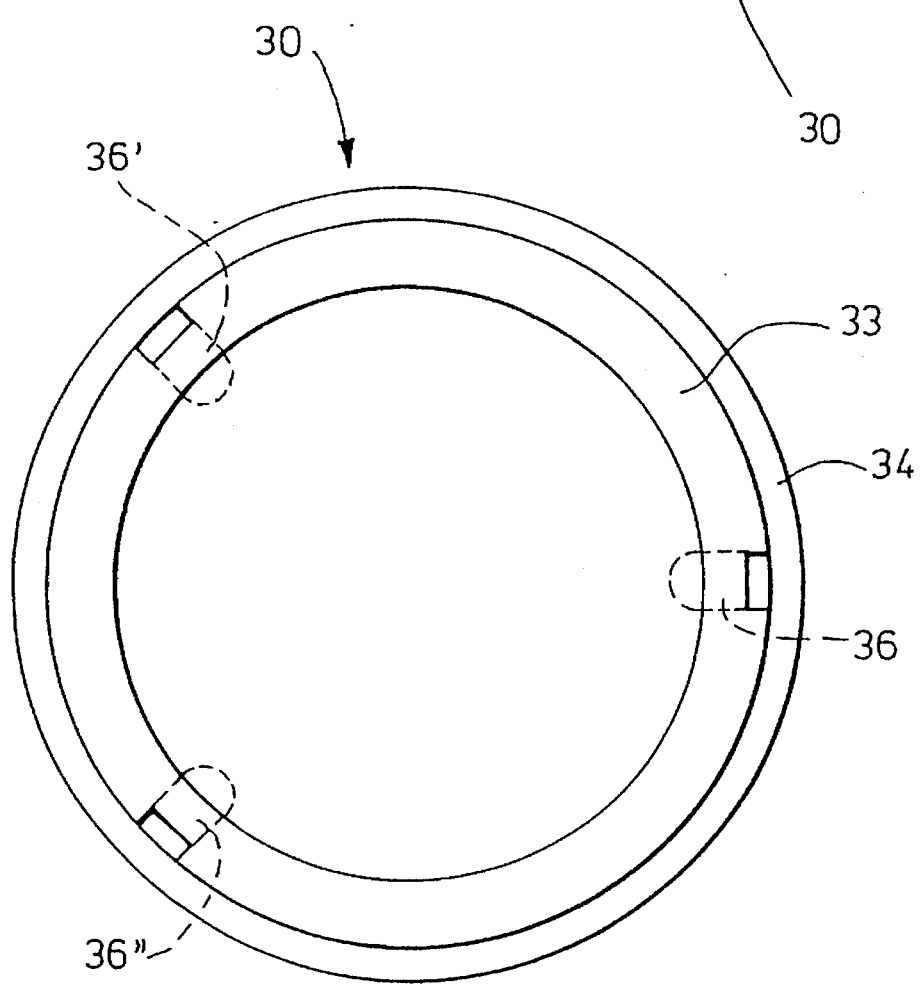
FIG. 3B is a plan view thereof.

FIG. 3A and 3B show an alternative embodiment 30 of an inventive sealing valve. A ring-shaped sealing-bead 34 is provided about the outer wall of a wall element 33. The wall element 33 extends perpendicularly with respect to a cover element 32. The sealing valve 30 is not slip-fit over an opening connector. Instead, sealing valve 30 is inserted into an opening bore of the container. Control channels 36, 36', 36" are also provided for in the sealing valve 30 on the outside of the cover element 32 and of the wall element 33. In order to further strengthen the sealing effect a central stopper 35 can be inserted, if appropriate, into the sealing valve 30 in accordance with FIG. 3. For the manufacture of the different described embodiments of the inventive sealing valve, rubber elastic materials, by way of example, silicone rubber, PU, polyvinylchloride (PVC), and preferentially fluoro-elastomers such as FPM and FCM are utilized. A fluoro-elastomer of this type is offered by the company DuPont under the trade name "Viton".

The stopper 35 in accordance with FIG. 3 can, by way of example, be comprised from a tough elastic or metallic material and can also exhibit a collar at its upper outer edge which inhibits too far an insertion of the stopper.

Figure 4A:
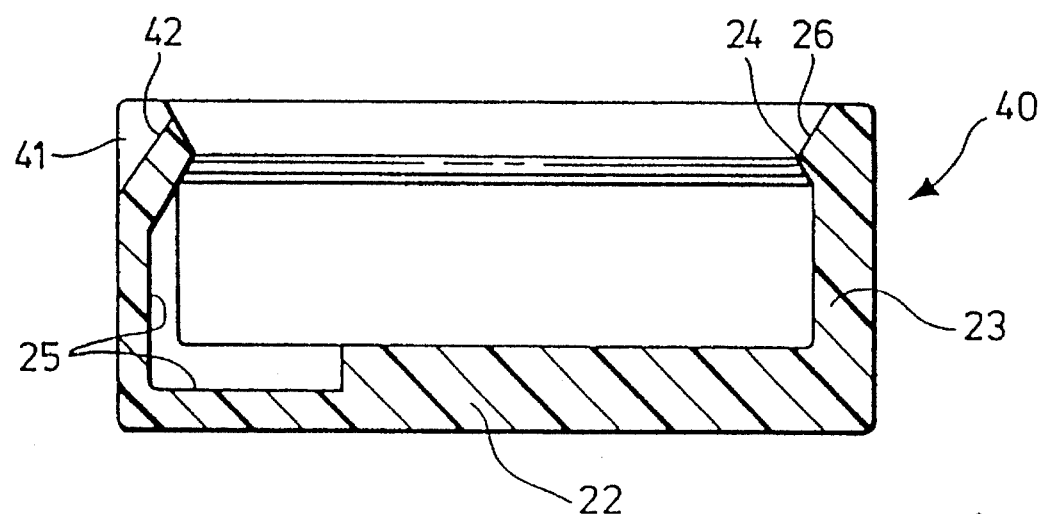
FIG. 4A is a cross sectional view showing an embodiment based on that of FIGS. 2A and 2B exhibiting a further improved embodiment of the sealing valve.
Figure 4B:
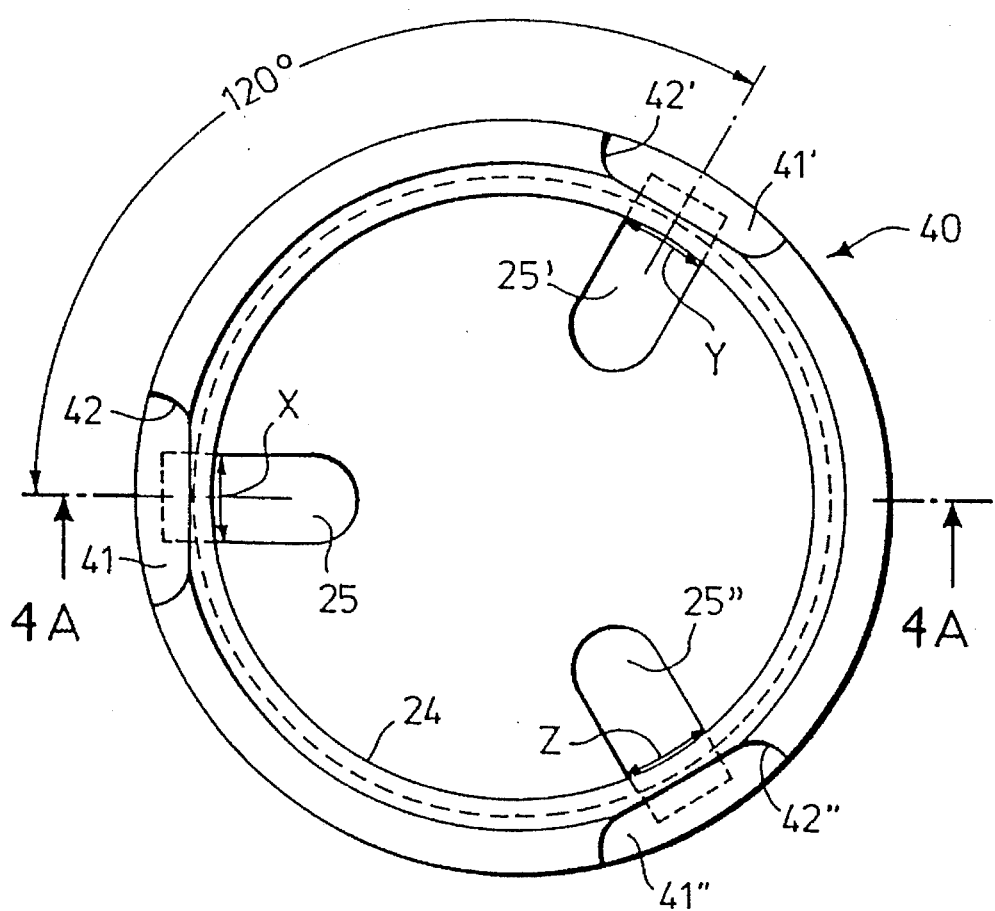
FIG. 4B is a plan view thereof.

FIG. 4 shows a further improved embodiment of a sealing valve according to the invention which is based on the embodiment of FIG. 2. The components in FIG. 4 corresponding to components in FIG. 2 are labelled with the same reference numbers and will not be described again.

The embodiment described in general with the reference number 40 is characterized by means of edge notches 41, 41' and 41" whose notch bottoms are each flush with and approximately twice as wide as the control channels 25. Preferentially, the edge notches 41, 41' and 41" have a profile which is particularly advantageous for production and are, for example, configured as circular arcs. The depth of the edge notches does not reach entirely up to the prominent edge of the sealing-bead. It is particularly advantageous when the notch in the region facing the edge 24 of the sealing-bead forms sharp edges 42, 42' and 42".

Clearly, the invention is not limited to the particularly advantageous embodiments having three control channels 25, 25', and 25" and three corresponding edge notches 41, 41', and 41" which are shown in FIG. 4. In principle a number of control channels which is appropriate to the given application and a corresponding number of edge notches can be chosen.

We claim:

1. A sealing valve made from a rubber-elastic material for a container having an opening, comprising:

a cover element;

a wall element integral with said cover element extending upward from said cover element around a periphery thereof;

a sealing-bead integral with and extending around one of an inside and an outside of said wall element, said sealing-bead having a tapered cross section projecting from said wall element and terminating in a sealing edge, said sealing edge being seatable on a surface of the container for sealing of the opening; and a control channel extending from said cover element to said sealing-bead.

2. The sealing valve of claim 1, wherein the wall element has a cylindrical form, the cover element is flat, and the sealing-bead exhibits a constant thickness.

3. The sealing valve of claim 1, wherein a thickness of the sealing-bead is less than a wall thickness of the wall element.

4. The sealing valve of claim 1, wherein a depth of the control channel assumes a value of approximately half a wall thickness of the wall element.

5. The sealing valve according to claim 1 for use as a gas release valve for storage battery cells having gas release openings.

6. A sealing valve made from a rubber-elastic material for a container having an opening, comprising:

a cover element;

a wall element integral with said cover element extending upward from said cover element around a periphery thereof;

a sealing-bead integral with and extending around one of an inside and an outside of said wall element; and three symmetric control channels displaced 120° from each other and extending from said cover element to said sealing bead.

7. The sealing valve of claim 6, wherein said sealing-bead comprises a prominent sealing edge.

8. The sealing valve of claim 6, wherein said wall element has a cylindrical form, said cover element is flat, and said sealing-bead exhibits a constant thickness.

9. The sealing valve of claim 6, wherein a thickness of said sealing-bead is less than a wall thickness of said wall element.

10. The sealing valve of claim 6, wherein a depth of said control channel assumes a value of approximately half a wall thickness of said wall element.

11. The sealing valve according to claim 6 for use as a gas release valve for storage battery cells having gas release openings.

12. A sealing valve made from a rubber-elastic material for a container having an opening, comprising:

a cover element;

a wall element integral with said cover element and extending upward from said cover element around a periphery thereof;

a sealing-bead integral with and extending around one of an inside and an outside of said wall element;

a control channel extending from said cover element to said sealing-bead; and said wall element having at least one notch which is flush with said control channel, with a number of notches being equal to a number of control channels, said notch having a depth terminating at a notch bottom ending before a beginning of said sealing-bead.

13. The sealing valve of claim 12, wherein said sealing-bead comprises a prominent sealing edge.

14. The sealing valve of claim 12, wherein said wall element has a cylindrical form, said cover element is flat, and said sealing-bead exhibits a constant thickness.

15. The sealing valve of claim 12, wherein three symmetric control channels, displaced 120° from each other, are provided.

16. The sealing valve of claim 12, wherein a thickness of said sealing-bead is less than a wall thickness of said wall element.

17. The sealing valve of claim 12, wherein a depth of said control channel assumes a value of approximately half a wall thickness of said wall element.

18. The sealing valve of claim 12, wherein a width of said notch at a said bottom of said notch adjacent to said sealing-bead is approximately equal to a width of said control channel.

19. The sealing valve of claim 12, wherein said notch is adapted to form a sharp edge at said notch bottom adjacent to said sealing-bead.

20. The sealing valve according to claim 12 for use as a gas release valve for storage battery cells having gas release openings.

* * * * *